United States Patent [19]
Pieverling

[11] Patent Number: 6,100,820
[45] Date of Patent: Aug. 8, 2000

[54] VEHICLE DETECTOR WITH AT LEAST ONE INDUCTIVE LOOP AS A SENSOR, AND A METHOD FOR PERFORMING VEHICLE DETECTION

[75] Inventor: Klaus V. Pieverling, Wolfratshausen, Germany

[73] Assignee: Siemens Aktiengesellschaft, Munich, Germany

[21] Appl. No.: 09/396,872

[22] Filed: Sep. 15, 1999

[30] Foreign Application Priority Data

Aug. 30, 1999 [DE] Germany .......................... 198 42 209

[51] Int. Cl.[7] ...................................................... G08G 1/01
[52] U.S. Cl. .......................... 340/941; 340/938; 340/934; 340/935; 340/936
[58] Field of Search .................................... 340/933, 938, 340/941, 934, 935, 936; 331/74; 323/909

[56] References Cited

U.S. PATENT DOCUMENTS

| | | | |
|---|---|---|---|
| 3,373,374 | 3/1968 | Marosi | 331/8 |
| 3,685,013 | 8/1972 | Brickner | 340/38 L |
| 4,639,689 | 1/1987 | Bartlett | 331/65 |
| 4,873,494 | 10/1989 | Jefferis | 331/65 |
| 5,936,551 | 8/1999 | Allen et al. | 340/941 |

FOREIGN PATENT DOCUMENTS

| | | |
|---|---|---|
| 0 521 627 A1 | 1/1993 | European Pat. Off. . |
| 0 523 852 A1 | 1/1993 | European Pat. Off. . |
| 0 523 853 A1 | 1/1993 | European Pat. Off. . |
| 1 287 321 | 1/1969 | Germany . |
| 15 74 079 | 12/1975 | Germany . |

*Primary Examiner*—Daniel J. Wu
*Assistant Examiner*—Hung Nguyen
*Attorney, Agent, or Firm*—Hill & Simpson

[57] ABSTRACT

A vehicle detectors with at least one inductive loop is used as a sensor. An oscillator circuit comprises a fixed-frequency oscillator, which is directly connected to one of the inductive loops' two terminals, for purposes of exciting said loop. In addition, a phase/amplitude controller is arranged between the fixed-frequency oscillator and the other terminal, which forms a summation point of the inductive loop to deliver a compensation signal that is derived from the transmit signal in an amplitude-controlled and phase-controlled manner. The inductive loop, the fixed-frequency oscillator and the phase/amplitude controller form a bridge circuit in which (with reference to the resulting voltage at the summation point) the transmit signal and the compensation signal add up to zero in the resting state of the inductive loop. A detection signal for the presence of a vehicle in the detection range of the induction loop is derived from a voltage at this summation point which deviates therefrom.

14 Claims, 3 Drawing Sheets

VEHICLE DETECTOR WITH AT LEAST ONE INDUCTIVE LOOP AS A SENSOR, AND A METHOD FOR PERFORMING VEHICLE DETECTION

BACKGROUND OF THE INVENTION

1. Field of the Invention

The present invention relates to a vehicle detector that has at least one inductive loop that is used as a sensor for performing vehicle detection utilizing a fixed-frequency oscillator, a phase/amplitude controller, and an evaluation unit that permits detection of a vehicle in the detection range of the induction loop.

2. Description of the Prior Art

Vehicle detectors are employed for purposes of detecting vehicles in traffic, and may be used to detect the presence, type, and/or speed of such vehicles. Inductive loops, among other things, have long been used as sensors in these types of vehicle detectors. These inductive loops are permanently embedded in the roadway of a traffic route—in a lane-related manner, if necessary.

Vehicle detectors of this type using inductive loops as sensors exploit the effect that the loop inductance varies depending on the metallic mass of a vehicle moving in the range of the inductive loop. It has long been known that, in order to evaluate this effect, the inductive loop must be accompanied by a modified capacitor to produce a resonant circuit, which is made to resonate by an excitation circuit. The resting frequency is defined as the frequency of this resonant circuit which arises when there is not a vehicle in the detection range of the inductive loop.

The resonant frequency changes from the resting frequency when the loop inductance changes, caused by a vehicle. The amount of change is proportional to the mass of the detected vehicle.

In this "oscillator solution", the present resonant frequency of the resonant circuit containing the inductive loop is measured, i.e., the frequency is counted in a digital evaluation. This measured frequency is then compared to its resting frequency, and the result is output as a detector signal indicating whether a vehicle is located in the detection range of the corresponding inductivity loop and, possibly, the type of vehicle.

As taught by the documents EP-A-0 521 627, EP-A-0 523 852 and EP-A-0 523 853, e.g., this known oscillator solution is relatively sensitive to various disturbing influences, such as neighboring inductive loops or current-carrying cable which is laid in the vicinity of the inductive loops. As the cited documents prove, extensive expenditures effort and costs must be made to compensate these types of disturbing effects, which are based on magnetic coupling. The cited document EP-A-0523 852 also demonstrates that, besides the technical expenditures for eliminating disturbance, the known oscillator solution has a further fundamental systemic disadvantage; namely, it covers a broad frequency band for signal evaluation. From the aspect of signal technology, only a bandwidth of 500 Hz would be required, assuming an evaluation time of 2 ms. But the frequency band covered in the evaluation of detector signals is of necessity orders of magnitude broader.

SUMMARY OF THE INVENTION

The present invention is based on the partial object of creating an additional embodiment for a vehicle detector of the type described above, that enables, above all, an optimally disturbance-free vehicle detection with minimal electronics expense. Another partial object of the present invention is to propose a method for vehicle detection by way of a vehicle detector of the type described above, which avoids the disadvantages associated with the known oscillator solution, particularly with respect to the expenditures for eliminating interference.

In a vehicle detector of the type described above, the first partial object is inventively achieved with a detector having an inductive loop as a sensor, and oscillator circuit, a sampling circuit, and an evaluator as described below.

This inventive solution does not refine the know oscillator solution discussed above to better cut off interference effects, but rather uses a completely different approach. One advantage of the present solution is that new sensors do not have to be installed in the roadway; rather, induction loops that are already installed can continue to be used, facilitating the use of the inventive solution considerably. This advantage can be exploited in that already existing inductive loops are merely excited in a completely different way than before, and corresponding loop states are evaluated.

To accomplish this, one end of the inductive loop is connected to a fixed-frequency generator. The inductive loop is excited by the transmit signal with a defined, unvarying operating frequency (in contrast to the known oscillator solution), making it unnecessary for individual resonant tuning of each individual inductive loop. Instead, current is fed in the form of the compensation signal from the fixed-frequency generator to the other end of the inductive loop via the phase/amplitude controller. The interconnection point of the output of the phase/amplitude controller and the second input of the inductive loop is defined as the summation point, since the transmit signal and the compensation signal are summed there. The current that is fed via the phase/amplitude controller of the inductive loop is set in phase and amplitude such that the voltage at this summation point becomes zero in the resting state of the inductive loop.

The inductive loop can be viewed as a bridge circuit in connection with the fixed-frequency generator and the phase/amplitude controller. The voltage to be tapped at the summation point, also referred to as bridge voltage, is amplified, digitized and fed to an evaluating circuit. In the resting state of the inductive loop, the digitized bridge voltage is zero, as prescribed above. If, however, a vehicle enters the detection range of the inductive loop, then its inductance naturally changes. The bridge is thrown out of balance. This results in a bridge voltage other than zero at the summation point, and the voltage is fed to the evaluating circuit in the described manner.

The inventive solution described above takes into account the fact that disturbing influences, which cause considerable problems in the known oscillator solution, are not primarily based on dynamically variable disturbing influences. Rather, they are based primarily on static effects, which can be compensated for only with considerable technical expenditures in the known oscillator solution. By contrast, in the inventive solution, the inductive loop is individually excited in the resting state such that the measuring signal to be evaluated has the value zero. This functional state is attained by way of a control circuit that is closed by the phase/amplitude controller, with the circuit operating selectively in a narrow frequency band. This functional state can thus be stabilized completely independent of the extent to which the related inductive loop is affected by electromagnetic radiation outside this frequency band in its respective environment.

Further developments of the solution described above allow one, without further effort, to excite a group of inductive loops and to evaluate their respective voltage at the summation point of the individual loop. This approach also carries the advantage that it is possible, for the most part, to continue to use existing systems for traffic guidance by means of vehicle detection; a multitude of inductive loops are already installed in the roadways of the traffic route for the purpose of vehicle detection.

The above approach only requires retrofitting at the interface between the permanently installed inductive loops and the evaluator for the loop statuses, which are provided in the system. By way of an additional multiplexer, which is inserted in the above described circuit, the signal statuses of the inductive loops which are joined into a group can be measured and evaluated in the described manner, one after the other, in sequence.

The method of vehicle detection described below as a solution to the other part of the problem is based on the same idea of feeding respective signals (the transmit signal and the compensation signal) to the inductive loop in the excited resting state, via its two terminals, such that a balance measurably arises at the summation point in the form of the voltage with the value zero.

It is particularly advantageous, given a group or several groups of such excited inductive loops as are described below, to develop the transmit signal as a sampled impulse, and to derive the compensation signal from the transmit signal. This opens up the possibility of easily switching over from one inductive loop to the next in the blackout (or "blanking") gaps of the pulse signal, for the sequential evaluation of the statuses of the individual inductive loops.

All inductive loops of a group are thus excited by the same transmit signal. The changeover, which ensues via the multiplexer, of the evaluation of one inductive loop to the next, is performed in a zero region of the modulated transmit signal. The result is that changeover problems, which unavoidably arise given inductances during the current flow, are avoided, and that the operating width can be reduced to the necessary scale as defined in terms of signal technology. This is a precondition for the adjacent operating of a plurality of such multiplexing systems with only slightly off-set operating frequencies, i.e., for operating a plurality of inductive loops in a larger system for traffic guidance.

DESCRIPTION OF THE PREFERRED EMBODIMENTS

Figure 1:
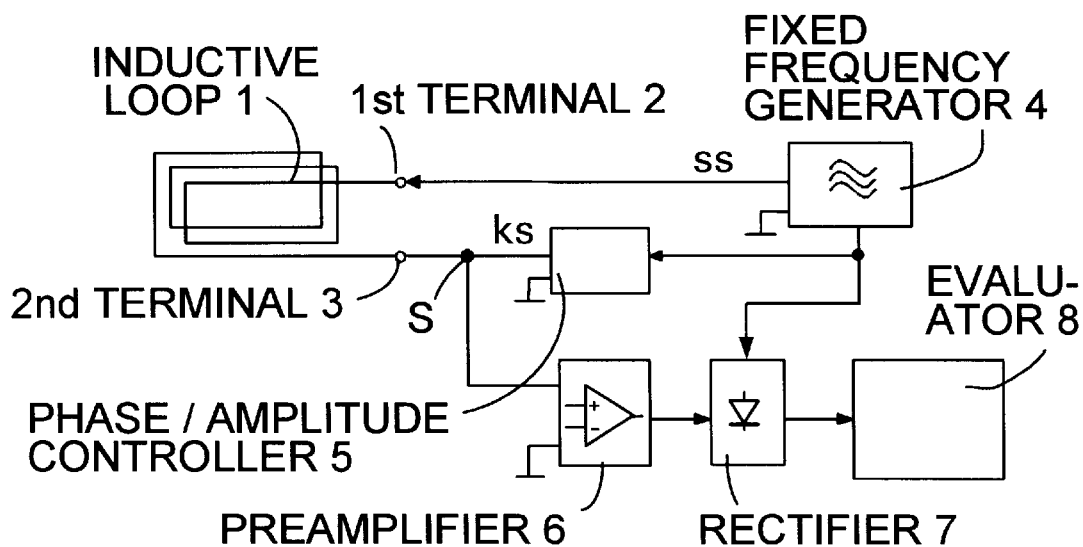
FIG. 1 is a block diagram showing a principal circuit for the excitation of an inductive loop and for the evaluation of a measuring signal of this inductive loop.

FIG. 1 illustrates a principal circuit diagram for a vehicle detector in which an inductive loop 1 is used as sensor. The inductive loop 1 has two terminals 2, 3. A first terminal 2 of the inductive loop 1 is connected to the output of a fixed-frequency generator 4, which excites the inductive loop 1 with a definite, prescribed operating frequency. The signal which is fed to the inductive loop 1 via the terminal 2 is referenced transmit signal ss. A second terminal 3 of the inductive loop 1 is connected to another output of the fixed-frequency generator 4 via a phase/amplitude controller 5. The signal that is fed by the phase/amplitude controller 5 to the inductive loop 1 via its second terminal 3 is referenced compensation signal ks. Controlling occurs in relation to the transmit signal ss, by phase and amplitude, such that both signals ss and ks are summed at a summation point S, which essentially coincides with the second terminal 3 of the inductive loop 1 in the example. The compensation signal ks is controlled here such that the voltage to be measured at the summation point in the resting state of the inductive loop 1 has a value of zero. That functional state is designated as the resting state of the inductive loop 1 when there are no vehicles located in the detection range of the inductive loop 1. The above described arrangement can thus be understood as a circuit bridge which is in balance in the resting state of the vehicle detector.

If, on the other hand, a vehicle enters the detection range of the inductive loop 1, then its inductance changes, which causes a change in the voltage at the summation point S. To detect a vehicle in the range of the inductive loop 1, the voltage status at the summation point S merely has to be measured and evaluated. A preamplifier 6 is provided for this purpose, which is connected to an evaluating signal input at the summation point S and which can, for example, be constructed as a difference amplifier. The analog measuring signal which is tapped at the summation point and amplified via this preamplifier 6 is fed to a rectifier 7.

The function of the rectifier 7 is essentially to derive a d.c. voltage signal from the high-frequency measuring signal tapped at the summation point S. The respective level of this voltage signal is a measure of whether or not there is a vehicle located in the detection range of the inductive loop 1 and, and possibly an indicator of the kind of vehicle. As indicated in FIG. 1, it is particularly advantageous to feed the output signal of the fixed-frequency generator 4 to this circuit unit as a control signal and to realize the rectifier 7 as a phase-controlled circuit. This enables a narrowband evaluation of the measuring signal that is tapped at the summation point S. This conditioned signal, which is emitted at the output of the rectifier 7, is fed to an evaluator 8. The processing of the signal that is fed to the evaluator 8, by itself, is of secondary importance here—known ways of vehicle detection can be consulted in this regard.

Figure 2:
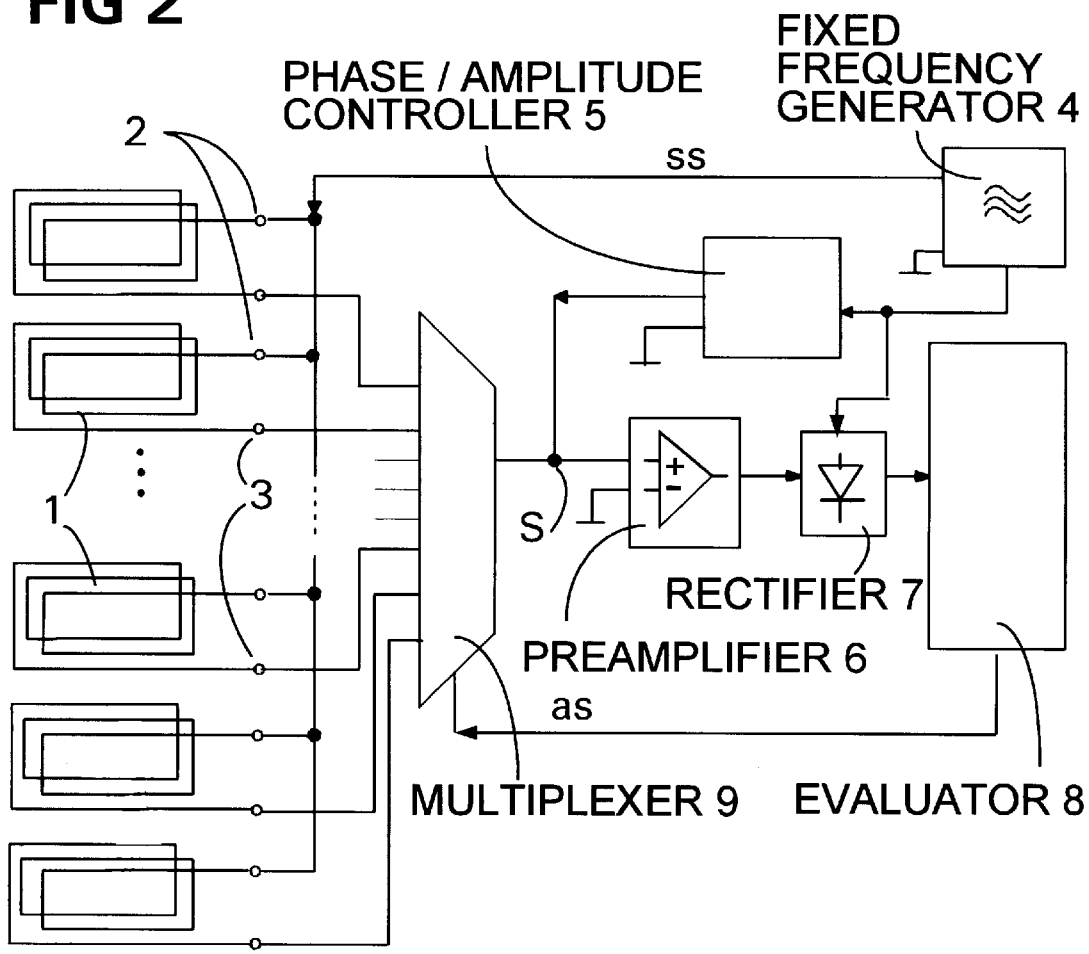
FIG. 2 is a block diagram showing a circuit arrangement in which a plurality of adjacently excited inductive loops are operated with the aid of a multiplexer according to the principal circuit illustrated in FIG. 1.

FIG. 2 schematically illustrates, in a block circuit diagram, that the operating principle described above with the aid of FIG. 1 can also be expanded into a multiplex circuit in which a group of, for instance, eight inductive loops 1 is provided as individual vehicle sensors. In this embodiment, the transmit signal ss emitted by the fixed-frequency generator 4 is fed in a parallel manner to the first terminals 2 of the inductive loops 1, which are connected to one another. The second terminals 3 of these inductive loops are connected to the summation point S, which is now shared, via a multiplexer 9. Analogously to FIG. 1, this summation point S is connected to an output of the fixed-frequency generator via the phase/amplitude controller 5, on one hand, in order to supply the compensation signal ks.

On the other hand, at this summation point S, the measuring signal is in turn tapped and fed to the evaluating means 8 via the preamplifier 6 and the rectifier 7, which is preferably phase-controlled here as well. As indicated in FIG. 2, selection signals (as), which are delivered by the evaluator 8, are fed to the multiplexer 9, in order to actuate and measure the individual inductive loops 1 in succession. As will be described below in greater detail, the transmit signal ss and the compensation signal ks are soft-modulated with respect to amplitude. This enables the changeover of the multiplexer 9 from one inductive loop 1 to the next in the zero region of the modulation. This loop changeover avoids changeover problems which would otherwise arise during the current flow, given an inductive loop 1 which can be perceived essentially as reactance.

Figure 3:
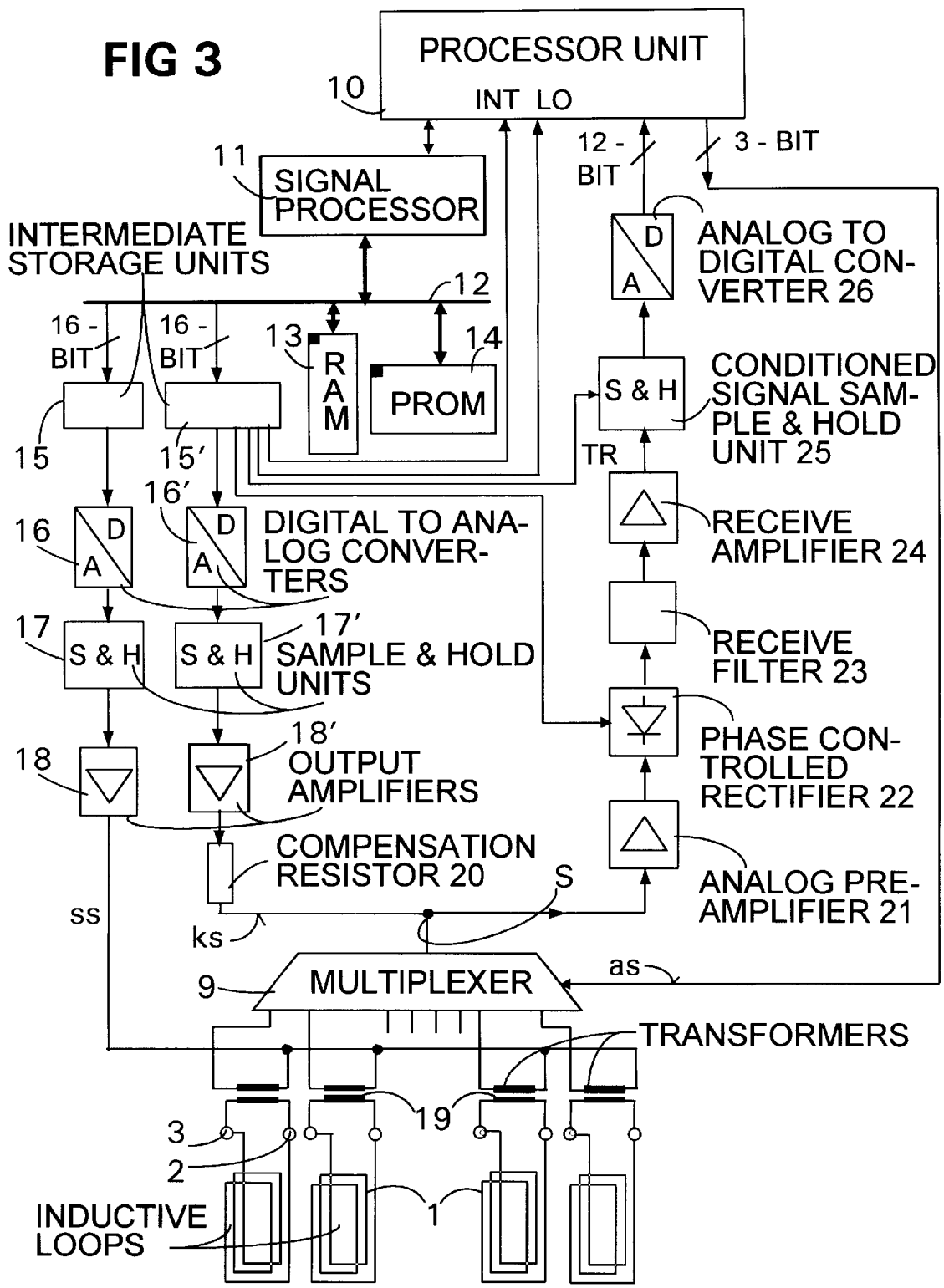
FIG. 3 is a block diagram exemplifying an embodiment of a processor-controlled system for vehicle detection, which utilizes a plurality of inductive loops as vehicle sensors.

FIG. 3 illustrates a transceiver of a vehicle detector with eight exemplarily connected inductive loops 1. The core piece of this device is a first processor unit 10, which cooperates with a second processor unit, here a signal processor 11, for example, via a serial interface in the manner of a master-slave configuration. The signal processor 11 serves, in connection with the units that are connected to it, or respectively, which cooperate with it, as a digitally implemented generator for purposes of generating the transmit signal ss, or respectively, the compensation signals ks for the connected inductive loops 1. The signal processor 11 is connected to a working memory and a programmable ROM 14 via a bus line 12 for this purpose.

To generate the transmit signal ss, a first intermediate memory 15, preferably implemented as a register with a width of 16 bits, is connected to the bus line 12; this memory can be constructed in the form of D-flip-flops, for example. Instantaneous values of the modulated transmit signal ss are stored temporarily in this intermediate storage unit 15 in digital form and are then fed to a connected digital-analog converter 16 in a cycled manner. A sampling and holding unit 17 with low-pass character is connected to the digital-analog converter 16; this unit is connected on its part to an output amplifier 18. Controlled by the signal processor 11, the devices 15 to 18 form the fixed-frequency generator illustrated in the FIGS. 1 and 2 in digital circuitry, with which the transmit signal ss is generated. This is fed to the inductive loops 1 via transformers 19 in a parallel manner.

Figure 4:
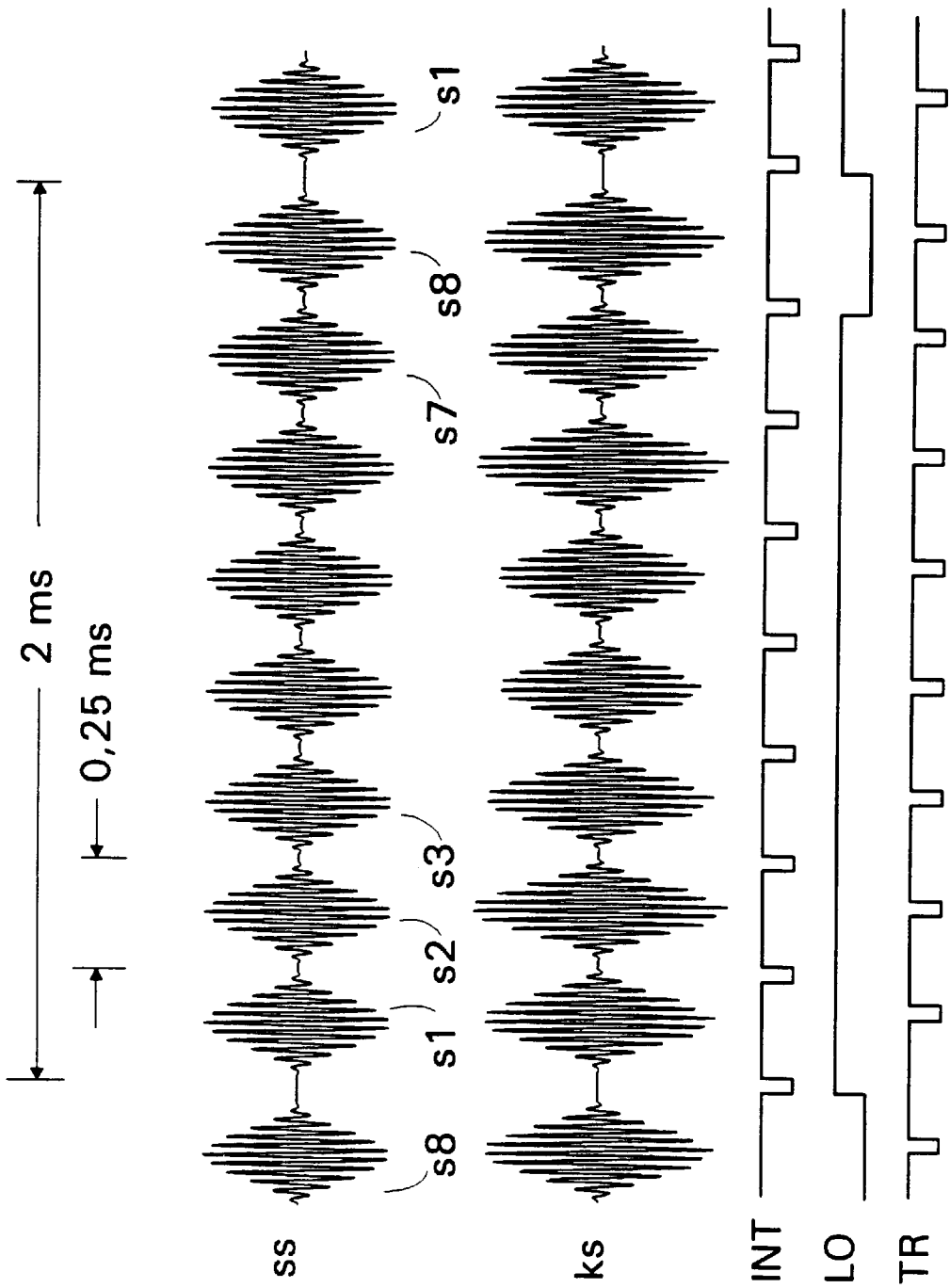
FIG. 4 is a timing diagram showing a series of impulses for purposes of explicating the system for vehicle detection illustrated in FIG. 3.

In the first line of FIG. 4, the generated transmit signal ss is illustrated in the form of an impulse diagram. This impulse diagram makes it clear that the transmit signal ss is a pulsed signal, whose impulse is developed as an amplitude-modulated oscillation of a definite predetermined operating frequency that has a soft beginning.

In a similar manner, as is illustrated in FIG. 3, the corresponding compensation signal ks, whose individual impulses are individually tuned specifically to one of the respective inductive loops 1, is generated with the circuit arrangement of an additional intermediate storage unit 15', an additional digital-analog converter 16', an additional sampling and holding unit 17', and an additional output amplifier 18'. This compensation signal ks is conducted to the summation point S and to the input of the multiplexer 9 via a compensation resistor 20. The compensation signal ks is presented to one of the transformers 19 that has been selected by selective through-switching via the multiplexer 9, and then to the inductive loop 1 that is connected to it.

The second line of FIG. 4 illustrates the corresponding pulse shapes of the compensation signal ks for the eight inductive loops 1 which are provided in the exemplifying embodiment of FIG. 3. The following gives a more exact description of the two pulse diagrams: the transmit signal ss repeats in a sequence of eight HF impulses s1 to s8 a short delay time after the former sequence. The time duration of a sequence is assumed to be 2 ms in this example. Within each sequence, the individual pulses of the transmit signal ss repeat in identical wave shapes by phase and amplitude. The time duration for one of the eight transmit pulses of each sequence is 250 μs. The compensation signal ks also repeats in the same time grid with corresponding sequences. But unlike the transmit signal ss, the individual impulses of the compensation signal ks are not identical to the isochronic impulse of the transmit signal ss, neither by phase nor by amplitude. Rather, they are characteristic of the properties of the respectively allocated inductive loop 1. Phase and amplitude values for the pulses of the compensation signal ks which are allocated to one of the inductive loops 1, respectively, are acquired in a calibration process and are stored in the ROM 14, which is allocated to the signal processor 11.

The loop changeover, detailed in FIG. 2, occurs by means of the multiplexer 9, the selection signals (as) being fed to it by the processor unit 10 for this purpose. To chronologically synchronize this loop changeover with the impulses of the transmit signal ss, or respectively, of the compensation signal ks, control signals are delivered, via the additional intermediate storage unit 15', both to the processor unit 10 and to individual circuit units of an evaluation branch of the circuit arrangement from FIG. 3 (detailed below).

These control signals are a matter of a series of interrupt signals INT or loop control signals LO, which are delivered to the processor unit 10 by signal processor 11 via the additional intermediate storage unit 15', the pulse shapes of which are likewise illustrated in FIG. 4. The sequence of the interrupt signals INT synchronizes the processor unit 10 with the pulse train of the transmit and compensation signal ss, or respectively, ks such that, among other things, this delivers the selection signals (as) to the multiplexer 9 synchronously with these pulse trains, and the multiplexer 9 switches over during the blanking gaps of these signals. Comparing the illustrated pulse trains of the interrupt signals and of the loop control signal LO to each other, it is clear that the processor unit 10 with the loop control signal LO is tuned to the respective sequence of the transmit and compensation signal ss, or respectively, ks. This measure contributes to reliability in that it recreates the synchronism of processor unit 10 and signal processor 11 again with each sequence, or respectively, each evaluation time for the group of inductive loops 1 connected to the multiplexer 9.

FIG. 4 shows an additional control signal In this connection, a tracking signal TR, whose trailing edge is chronologically tuned to the maximal amplitude of the pulses s1 to s8 of the transmit signal ss. As will be demonstrated, this serves to synchronize operational processes in the evaluator for the measuring voltage tapped at the summation point S with the pulse trains generated at the transmit side.

Returning to FIG. 3, an analog receive preamplifier 21 is provided in the receive circuit that is arranged between the summation point S and the processor unit 10; this preamplifier is connected to the summation point S. The output signal of the preamplifier is fed to a receive filter 23 via a commutator, i.e., a phase-controlled rectifier 22. A receive amplifier 24 is connected to the rectifier, and the output signal of the amplifier is fed to a conditioned signal sampling and holding unit 25. An analog-digital converter 26 is connected to the sampling and holding unit, and the converter's parallel outputs are connected to data inputs of the processor unit 10. The phase-controlled rectifier 22 ensures the rectifying, in a phase-controlled manner relative to the compensation signal ks, of the analog voltage that is tapped at the summation point S and amplified via the analog receive preamplifier 21. This measure enables a simple bandwidth limitation in the further evaluation of the analog measuring signals tapped at the summation point S. In the receive filter 23 connected thereto, the output signal of the phase-controlled rectifier 22 is limited in bandwidth and, having been amplified by the receive amplifier 24, is subsequently fed to the conditioned signal sampling and holding unit 25. This is activated by tracking signal TR. Defining the transition of this signal from low level to high level as its controlling edge, the representation of its pulse train illustrates the following: the tracking signal TR activates the conditioned signal sampling and holding unit 25 with a specific delay time subsequent to the maximal amplitude of each impulse of the compensation signal ks. This delay takes into account the signal transit time of the measuring signal which is tapped at the summation point up to the input of the conditioned signal sampling and holding unit 25, this signal transit time being determined by the filtering transit time of the receive filter 23. With this measure, conditioned signal sampling and holding unit 25 samples the maximal value of the conditioned measuring signal and holds it for the connected analog-digital converter 26. This appreciably reduces the computing expenditures in the processor unit 10, to which the digitized maximal amplitude of the measuring signal tapped at the summation point is fed, in order to derive a corresponding detector signal from it for the respectively selected inductive loop 1.

In the exemplifying embodiment of FIG. 4, as already described, a duration time of 2 ms is assumed for one sequence of the transmit signal and the compensation signal ss, or respectively, ks. In other words, this duration time corresponds to the required evaluation time for the connected group of eight inductive loops 1. Accordingly, an impulse period of 250 $\mu$s results for the individual pulse of the transmit signal ss, or respectively, of the compensation signal ks. Based on this pulse period, the optimal bandwidth, as limited by the receive filter 23, of the conditioned measuring signal is 4 kHz. Depending on the realized filter quality of the receive filter 23, it would thus be possible to operate additional groups of inductive loops 1 in a frequency interval of only a few kHz, without having to fear interference, couplings, or the like as a result.

This bandwidth limitation of the measuring signals in the described exemplifying embodiments is particularly advantageous when a plurality of inductive loops are to be provided in a complex traffic signaling system. In such a system, it would be necessary to form corresponding additional groups of inductive loops, which would have to be connected, in combination with their respective transmit and receive branches, to the bus line 12, or respectively, to the data input side of the processor unit 10 (this is beyond the scope of FIG. 3).

Although modifications and changes may be suggested by those skilled in the art, it is the intention of the inventors to embody within the patent warranted hereon all changes and modifications as reasonably and properly come within the scope of their contribution to the art.

I claim as my invention:

1. A vehicle detector comprising:
    a sensor comprises an inductive loop, having a first terminal and a second terminal,
    an oscillator circuit which excites said inductive loop,
    a sampling circuit which determines an operational status of said inductive loop, and
    an evaluator that is connected to the sampling circuit for purposes of deriving a detector signal that corresponds to the instantaneous status of the inductive loop,
    wherein said oscillator circuit comprises:
        a fixed-frequency generator, which has a first terminal and a second terminal, wherein said generator first terminal is connected to said inductive loop first terminal and sends a transmit signal to excite said inductive loop, and
        a phase/amplitude controller, which is arranged between said fixed-frequency generator and said inductive loop second terminal, wherein said inductive loop second terminal has a summation point for purposes of supplying a compensation signal, wherein
        a bridge circuit is formed by said inductive loop, said fixed-frequency generator and said phase/amplitude controller, which is balanced at zero voltage at said summation point in a resting state of said inductive loop, and that said sampling circuit, which is connected to said summation point, is implemented as a voltmeter.

2. A vehicle detector as claimed in claim 1, wherein:
    said fixed-frequency generator is implemented as a resonating oscillator which is pulsed with a predetermined pulse frequency and said transmit signal is formed from transmit pulses in the form of an amplitude-modulated high frequency oscillation.

3. A vehicle detector as claimed in claim 2, wherein:
    said sampling circuit that is connected at said summation point comprises a phase-controlled rectifier, said rectifier having a control input into which said compensation signal is fed.

4. A vehicle detector as claimed in claim 3, wherein:
    said sampling circuit has a receive filter which is implemented as a narrowband filter and is connected at an output of said phase-controlled rectifier, wherein a bandwidth thereof relates to an evaluation time, as determined by said sampling circuit, for the status of said inductive loop.

5. A vehicle detector as claimed in claim 1 comprising a group of inductive loops in known fashion, wherein:
    each first terminals of said inductive loops are connected to said fixed-frequency generator in parallel,
    a multiplexer is provided, having an input that is connected to an output of said phase/amplitude controller via said summation point, and an output of said multiplexer is connected to each second terminal of said group of inductive loops, respectively, for purposes of the sequential connecting of each inductive loop to said summation point, whereby
    said sampling circuit that is connected to said summation point sequentially evaluates the instantaneous status of said each inductive loop.

6. A vehicle detector as claimed in claim 5, wherein:
    said multiplexer is actuated for the sequential changeover from one of said inductive loops to a next said inductive loop, such that said changeover respectively occurs in a zero region of said transmit signal of said fixed-frequency generator.

7. A vehicle detector as claimed in claim 4, wherein:
    said oscillator circuit is implemented as a processor-controlled digital circuit.

8. A vehicle detector as claimed in claim 7, wherein:
    said oscillator circuit, which is implemented as said digital circuit, comprises a signal processor as a controlling unit, wherein said processor is connected to intermediate storage units for purposes of temporarily storing digitized instantaneous values of the transmit and compensation signals, wherein a digital-analog converter is respectively connected to parallel outputs of said intermediate storage unit, analog outputs of said converter being respectively connected, via a sampling and holding unit, to an output amplifier, which is connected on its part to said each first terminal of said inductive loops, or respectively, via said summation point to said input of said multiplexer.

9. A vehicle detector as claimed in claim 7, wherein:

said sampling circuit is implemented as a digital circuit, to which a processor unit is allocated as an evaluation unit, said processor unit operating in synchronism with a controlling unit of said oscillator circuit and being connected to said controlling unit in which said controlling unit forms the master of a master-slave configuration.

10. A vehicle detector as claimed in claim 9, wherein:

said sampling circuit has an analog receive preamplifier, said preamplifier having an input which is connected at said summation point, wherein said preamplifier, said phase-controlled rectifier, said receive filter, and an analog-digital converter are connected in series, wherein said converter has an output which is connected to said processor unit.

11. A method for vehicle detection, comprising the steps of:

providing a vehicle detector having:
an inductive loop comprising a sensor and having a first terminal and a second terminal,
an oscillator circuit to excite said inductive loop,
a sampling circuit to determine an operational status of said inductive loop, and
an evaluator, connected to said sampling circuit, to derive a detector signal corresponding to the instantaneous status of the inductive loop, feeding a high frequency transmit signal having a predetermined fixed frequency to said inductive loop via said first terminal, feeding a compensation signal derived from said transmit signal to a summation point that coincides with said second terminal of the inductive loop, said compensation signal being derived from said transmit signal with respect to amplitude and phase in such a manner that a resulting voltage at said summation point adds up to zero in a resting state of said inductive loop, sampling the voltage at said summation point; and deriving a detection signal for the presence of a vehicle in a detection range of said induction loop from a voltage being present at said summation point and deviating from the value zero.

12. The method for vehicle detection of claim 11 employing a group of inductive loops and further comprising the steps of:

feeding said transmit signal respectively to said inductive loops via first terminals being connected in parallel, sampling voltages at second terminals of said inductive loops sequentially, in time multiplex, and feeding said sampled voltages to said summation point, feeding impulses of said compensating signal, which are individually allocated to one of said inductive loops, synchronously with said sampling of voltages of said second terminals of said inductive loops to said summation point, and tapping the voltage at said summation point in synchronism with a train of pulses of said compensation signal for purposes of deriving said detector signals for each of said inductive loops.

13. The method for vehicle detection of claim 12, further comprising the steps of:

developing said transmit signal as a sampled impulse, whose successive pulses are developed in the form of an amplitude-modulated high frequency oscillation with a predetermined frequency, and performing a changeover of an evaluation of said operational status of one of said inductive loops to an evaluation of said operational status of a next sequential inductive loop of said inductive loops, which ensues according to said step of sampling voltages at second terminals, in a zero region of said transmit signal.

14. The method for vehicle detection of claim 12, further comprising the steps of:

preamplifying an analog signal for evaluation which is tapped at said summation point, rectifying said analog signal, bandpass filtering said analog signal and limiting it to a frequency band that corresponds to its evaluation time, to produce a conditioned analog signal and deriving said detector signal from said conditioned analog signal.

* * * * *